E. GRUENFELDT.
STEERING GEAR.
APPLICATION FILED MAR. 17, 1913.

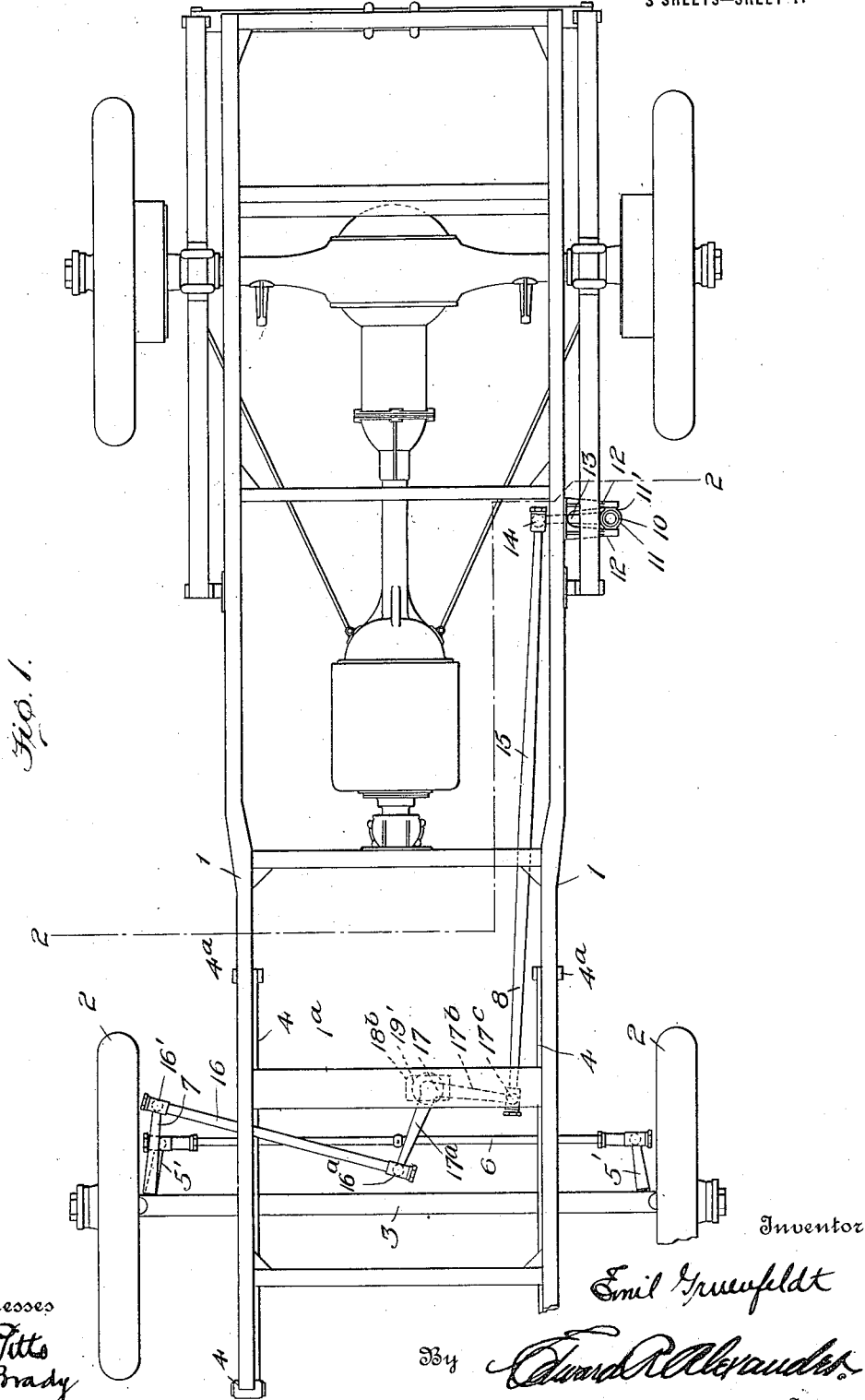

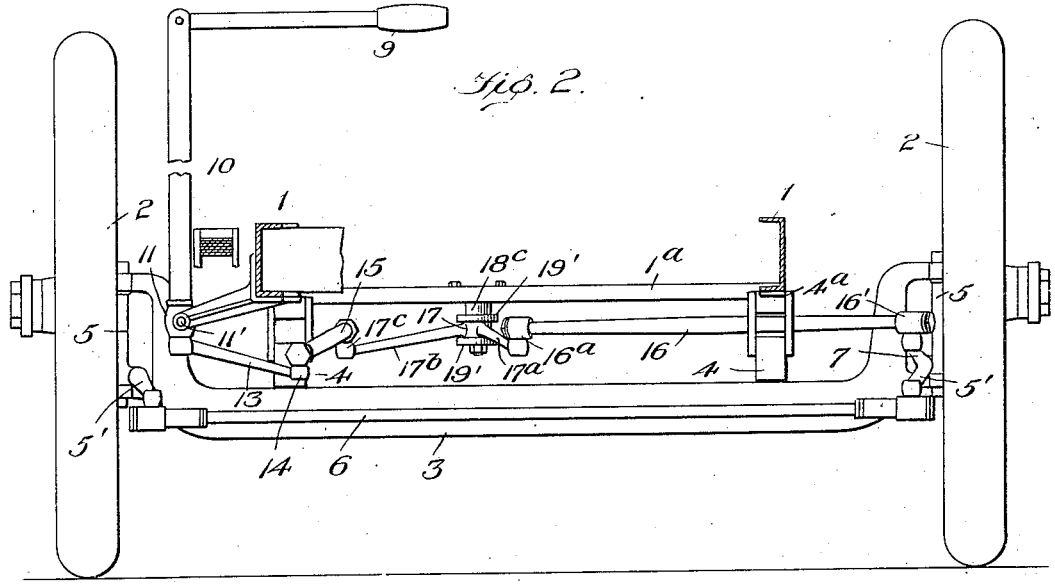
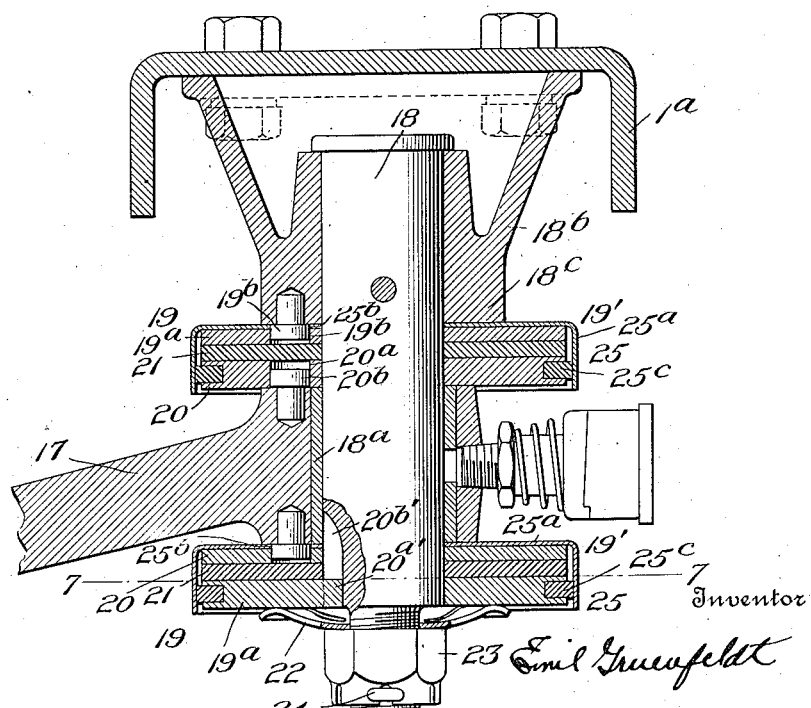

1,272,800.

Patented July 16, 1918.
3 SHEETS—SHEET 3.

Witnesses
Geo. B. Pitts
L. C. Brady

Inventor
Emil Gruenfeldt
By Edward R. Alexander
Attorney

UNITED STATES PATENT OFFICE.

EMIL GRUENFELDT, OF CLEVELAND, OHIO, ASSIGNOR, BY MESNE ASSIGNMENTS, TO THE BAKER R. & L. COMPANY, OF CLEVELAND, OHIO, A CORPORATION OF OHIO.

STEERING-GEAR.

1,272,800.

Specification of Letters Patent.

Patented July 16, 1918.

Application filed March 17, 1913. Serial No. 754,981.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Steering-Gears, of which the following is a specification.

This invention relates to steering gears or mechanism for motor vehicles. The invention has for its object to provide means for reducing, and overcoming or absorbing the shocks and jars on the steering arm, wheel or lever of the vehicle due to contact of the steering wheel or wheels of the vehicle with obstructions and uneven surfaces over which the vehicle is traveling, with resulting relative movement of frame and body to the steering axle and oscillation or swinging of the steering wheels about their steering axes, respectively.

For the purpose of illustration, I have in the accompanying drawings, shown and herein described one form of steering mechanism embodying my invention.

Figure 1 is a fragmentary view of the motor vehicle, the body of the vehicle being omitted, embodying my invention.

Fig. 2 is a section on the line 2—2 of Fig. 1.

Fig. 3 is a sectional view illustrating certain details of construction.

Figure 4:
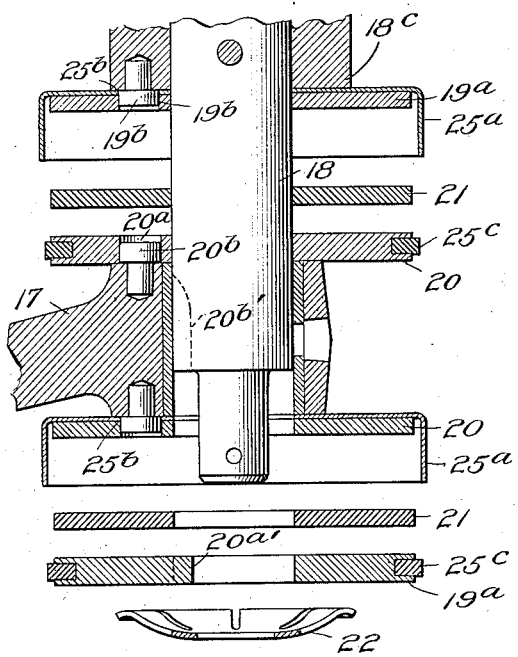
Fig. 4 is a view similar to Fig. 3 showing the devices separated.
Figure 5:
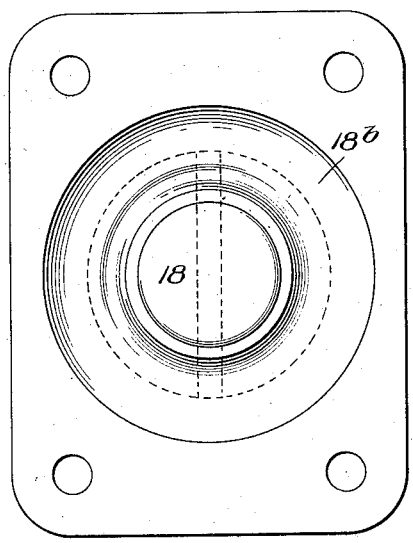
Fig. 5 is a bottom plan view of the stud shaft and base therefor.
Figure 6:
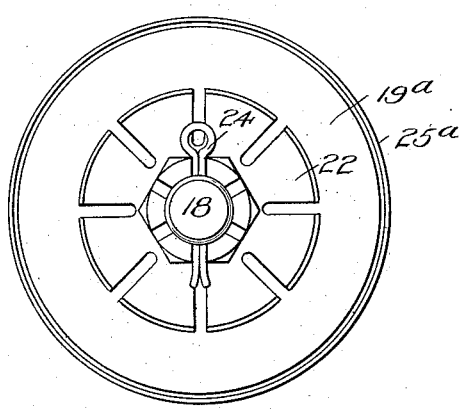
Fig. 6 is a bottom plan view of the elements shown in Fig. 3, the lever arms being omitted.
Figure 7:
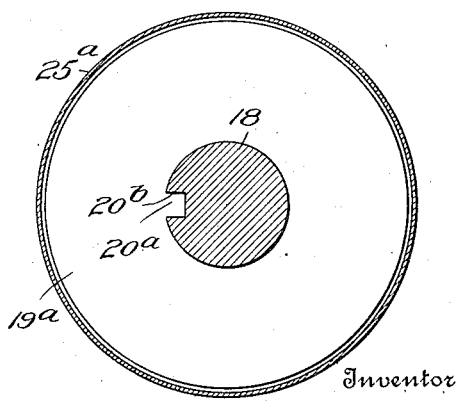
Fig. 7 is a section on the line 7—7 of Fig. 3.

In the drawings, 1 indicates a suitable frame, a fragmentary portion only of which is shown, 2 the steering wheels for the vehicle, 3 the axle for the wheels, 2 and 4 springs interposed between the axle 3 and frame 1. Each of these springs is pivotally connected at its front end to the frame at 4' and has its rear end shackled at 4ª to the frame. 5 indicates a steering knuckle between each wheel 2 and the axle 3. Each knuckle 5 is provided with an arm 5' which is connected by a tie rod 6 with the arm 5' of the other knuckle, whereby both wheels may be swung or moved simultaneously and to a like degree.

The parts above referred to may be of any standard or preferred form of construction. Since they in themselves do not form a part of my invention, they will not be further described.

7 indicates an arm or lever rigidly connected to or formed integral with one of the knuckles 5. 8 indicates as an entirety connections between the arm 7 and the steering arm, or lever 9 of the vehicle which the driver of the vehicle operates to swing the wheels 2 to steer it.

Of the steering connections 8, 10 indicates a vertically disposed rod or bar to which the vehicle steering arm or lever 9 is pivotally connected in a well known manner to swing in vertical planes. This rod or bar 10 may, adjacent to its lower end, be pivotally mounted to swing about its axis in any well known manner. For the purpose of illustration I have shown it mounted to swing in a journal piece 11 which in turn is pivotally mounted at 11' in a bracket 12 rigidly secured to the frame of the chassis. 13 is an arm or lever rigidly secured to the lower end of the bar 10 at one end and at its other end having universal connection 14 with a rod or bar 15. This rod 15 preferably extends substantially longitudinally of the frame 1. 16 indicates a rod having one end pivotally connected, preferably by a universal connection 16', to the rear end of the arm or lever 7. 17 indicates a lever, preferably a bell crank lever, to one arm, 17ª, of which the opposite end of the member 16 is pivotally connected, preferably by a universal connection 16ª, and to the other arm, 17ᵇ, of which the free end of the rod 15 is pivotally connected as by a universal joint 17ᶜ. 18 indicates a stud shaft, which preferably depends from a cross bar 1ª of the frame 1, and is preferably provided with a suitable bushing 18ª, to rotatably support the lever 17, as clearly shown in Fig. 3. A plate 18ᵇ, having a base 18ᶜ, to which the shaft 18 is fixed in any preferred manner, may be secured to the under face of the cross member 1ª and serve as the support for the shaft 18.

19 indicates as an entirety devices for absorbing the shocks and jars on the steering mechanism caused by the contact of the steering wheels with obstructions and uneven surfaces over which they travel. These devices are preferably interposed between the lever 17 and its supporting means. I preferably provide two sets of shock absorbing devices 19', 19' arranged on opposite sides of the lever 17, as shown in the drawings.

Of the shock absorbing devices 19' (referring to the set of devices arranged between the upper side of the lever 17 and the base 18$^c$), 19$^a$ indicates a friction plate fixed to the base 18$^c$ by a pin or key 19$^b$ carried by the base 18$^c$ and fitting an opening 19$^{b'}$ formed in the plate 19$^a$. The plate 19$^a$ is preferably of circular shape and formed with an axial opening which permits it to be placed over the shaft 18. 20 indicates a friction plate movable with the lever 17. This plate is preferably similar in shape and size to the stationary plate 19$^a$ and formed with an axial opening which permits it to rotatably fit the shaft 18. The plate 20 is also formed with an opening 20$^a$ to receive a pin or key 20$^b$ by means of which it is fixed to the upper side of the lever 17. The plates 19$^a$, 20, are preferably formed from brass. 21 indicates a disk or washer loosely mounted on the shaft 18 and interposed between the friction plates 19$^a$ and 20. The disk or washer 21 is preferably similar in size and shape to the plates 19$^a$, 20, and may be formed of leather.

The shock absorbing devices 19' arranged at the lower side of the lever 17 are preferably similar in construction to the set of devices just described, except that the friction plates 19$^a$ and 20 are in reverse arrangement, that is to say, the movable plate 20 is arranged above the stationary plate 19$^a$, with the washer 21 between them. The stationary plate 19$^a$ of the lower set of shock absorbing devices 19' may be provided with a projection 20$^{a'}$ which fits a groove or recess 20$^{b'}$ formed in the shaft 18, to hold the plate stationary thereon.

22 indicates a yieldable device, preferably comprising a resilient plate, loosely fitting the shaft 18 and arranged to bear against the lower stationary friction plate 19$^a$. 23 indicates a nut screw threaded to the free end of the shaft 18 and arranged to hold the resilient plate 22 in operative engagement with the adjacent plate 19$^a$. As the friction plates and disks constituting the sets of shock absorbing devices and the lever 17 are movable endwise on the shaft 18, it will be understood that the tension of the yieldable device 22 will be transmitted by each of these parts to the other so that the stationary and movable plates of each set of shock absorbing devices will engage the interposed disk or washer with considerable friction and result in absorbing the shock due to the contact of the steering wheels with obstructions and prevent them from being transmitted to the steering arm, wheel or lever of the vehicle. As will be readily understood, the nut 23 may be adjusted to increase or decrease the tension of the yieldable device 22. As shown at 24, the nut may be provided with a lock of any suitable construction.

25 indicates means for inclosing each set of shock absorbing devices 19' to make them dust proof. Of these means, 25$^a$ indicates a member, preferably of inverted cup-shape and arranged to receive within its circumferential wall a set of shock absorbing devices 19'.

As will be clearly understood from the drawings, each member 25 rests upon the uppermost friction plate of each set of shock absorbing devices 19' so that its circumferential wall surrounds the peripheral edges thereof. 25$^c$ indicates a packing ring surrounding the lowermost friction plate of each set of devices 19' and interposed between it and the circumferential wall of the adjacent cup member 25$^a$. The periphery of the lowermost friction plate of each set of devices 19' is preferably formed with a groove within which the ring 25$^c$ fits. The ring 25$^c$ closes the space between the friction plate and the open end of the cup member and thus operates to keep out of the shock absorbing devices dust, dirt, grit and other foreign matter which would in any manner affect their operation and durability.

Each member 25$^a$ is formed with an axial opening to receive the shaft 18, and also with an aperture 25$^b$ to receive the pin 19$^b$ or 20$^b$ to connect it to the adjacent friction plate.

Each of the pivotal connections in the train of connections indicated as an entirety by 8 is preferably of the ball and socket type, that is, in nature a universal connection, and each of them should, as it does, permit relative horizontal movement of the parts of the steering mechanism which it connects.

In motor vehicles in which it is found most convenient for any of many reasons to use a steering arm or lever, mounted to swing about the axes both of horizontally and vertically disposed pivots, (as contradistinguished from the well known type of wheel steer) and in which a longitudinally disposed rod serves to connect an arm corresponding to the arm 7 on a steering knuckle, to a lever arm at the lower end of a vertically disposed steering post corresponding to the one I have designated 13, in actual practice in driving a vehicle thus steered over a roadway with a rough surface, such as stone blocks, uneven bricks, rough asphalt, or macadam and the like, as the steering wheels accommodate themselves to the unevennesses of such road surface, an undesirable vibrating of the end of the steering lever 9 in the hand of the operator results. The normal tendency of the steering wheels, mounted as they are, is to right themselves as against the slight deflections which they make in encountering and accommodating themselves to such unevenness of road surface, so that when this unevenness of road surface is encountered, substantially continuous vibration to a greater or less degree of the steering lever in the hand of the operator is occasioned.

The arrangement of steering connections herein described as disclosing one embodiment of my invention is peculiarly suited for use in connection with steering mechanism embracing a lever or arm for retention in the hand of the operator. By this it is not to be understood that my idea is not likewise applicable in connection with the wheel type of steering mechanism as generally constructed, as it may be used therewith, only it does not necessarily possess as many distinct advantages in connection with the wheel type of steering mechanism as it does with the arm or lever type.

In operation, assuming that the steering wheels, as disclosed in Fig. 1, meet with an unevenness in road surface which tends to swing them slightly in clockwise direction about the axes of their respective steering knuckles, this will cause the arm 7 to similarly swing about the axis of the steering knuckle with which it is connected, and, since the rod 16 has connection at one end with the arm 7 and at its other end with one arm of the lever 17, the movement of the rear end of the arm 7, if it is greater than may be absorbed between the universals at opposite ends of the rod 16, will impart to the lever 17 anti-clockwise movement of that lever about the axis of the shaft 18; some of the motion which is thereby imparted to the other arm of the bell crank lever 17 may be absorbed in the universal joints at opposite ends of the rod 15. In this consideration I have not contemplated the shock absorbing characteristics of the sets of shock absorbing devices 19, 19', treating them as not present. It will be understood that if we treat them as present, they in turn tend to absorb shocks or thrusts delivered to the bell crank lever through the rod 16. Furthermore, the presence of the shock absorbing mechanism at 19, tending to prevent as it does rotation in either direction of the bell crank lever 17, serves to hold the universal connection between one arm of the bell crank lever and the rod 16 in such manner as to insure that the universals at the opposite ends of the rod 16 will accommodate to their full extent slight oscillation of the rear end of the arm 7 without imparting corresponding movements to the bell crank lever 17. In other words my arrangement of connecting devices between the steering arms 7 and 13 is such as to tend to absorb or direct away from the arm 13 slight vibratory movements of the rear end of the arm 7, due to corresponding vibratory movements of the steering wheel, in such manner as not to reach the arm 13 and through it impart corresponding undesirable vibration to the steering lever 9 in the hand of the operator, while at the same time and at all times having the control of the steering of the steering wheels instantly and positively at the command of the operator.

The relative up and down movement of the frame 1 to the axle 3 during expansion and contraction or lengthening and shortening for any reason of the springs 4 tends to vary the distance between the lower end of the bar 10 and the axle 3 and arm 7 carried thereby. It will be noted that the connections 8 between the rear end of the lever 7 and the free end of the lever 13 are such as to accommodate for this relative movement to quite an extent without imparting undesirable thrusts or jerks to the steering gears of this general type now customarily used, resulting in disagreeable vibration of the steering arm 9.

Furthermore, as the end of the rod 16 connected to the lever 17 is relatively close to the axle 3, when the frame rises and falls relative to the axle in the ordinary operation of the car and the springs are thereby correspondingly lengthened or shortened, causing relative movement of the arm 7 to the frame, the rear end of which is connected to the rod 16, the tendency of the arm 16 to impart corresponding movement to the lever 17 is greatly minimized.

The interposition in the train of steering connections of a shock absorbing device having the functions of the one at 19, I have found to be of considerable advantage, though it is not absolutely essential. When employed, however, it coöperates with the elements interposed between the arms 7 and 13 to accomplish a desired result.

It should be observed that I have disposed the transverse frame member 1$^a$ well forward, so that the lever 17 carried thereby has its front arm 17$^a$ disposed relatively close to the steering axle 3. This makes it possible to arrange the connecting rod 16 obliquely, as shown, so that the latter as an entirety lies relatively close to the steering axle and finds ample clearance between the longitudinal frame bar 1 and the adjacent spring 4, while at the same time the leverage of the parts is effective and such as desired.

While the use of a bell crank lever as one of said elements has been found preferable by me, it will be understood that other forms of lever may be adapted to accomplish the same purpose.

To those skilled in the art of making apparatus of the class described many alterations in construction and widely differing embodiments and applications of my invention will suggest themselves, without departing from the spirit and scope thereof. My disclosures and the description herein are purely illustrative and are not intended to be in any sense limiting.

What I claim is—

1. In apparatus of the class described, the combination of a frame, a hand steering device swiveled thereon, a rod disposed longitudinally of said frame and pivotally connected to the lower end of said hand steering device, a lever pivoted intermediate of its ends to said frame and having one of its ends connected with the front end of said longitudinally disposed rod, an axle having steering knuckles connected together for simultaneous operation and a steering arm, a rod disposed obliquely to the steering axle and having its rearmost end pivotally connected to one end of said steering arm and having its foremost end pivotally connected to the other end of said lever, and means connecting said axle and frame together.

2. In apparatus of the class described, the combination of an axle having steering knuckles connected together for simultaneous operation and a steering arm, a frame, means connecting said frame and axle together, a rod disposed obliquely to the steering axle and having its rearmost end pivotally connected to the free end of said steering arm and disposed to receive therefrom and deliver thereto thrusts at an angle to said steering arm and to said frame, a lever pivotally connected intermediate of its ends to said frame and having one end pivotally connected to the foremost end of said rod, a hand steering device swiveled on said frame, and a rod pivotally connected at one end to the lower end of said hand steering device and at its other end to the other arm of said lever.

3. In apparatus of the class described, the combination of a frame, a longitudinally disposed rod, a rod disposed at an angle to said longitudinally disposed rod, a lever pivotally connected to said frame and having its opposite ends pivotally connected to the adjacent ends of said rods respectively, a hand steering device swiveled on said frame and connected at its lower end with the adjacent end of said longitudinally disposed rod, an axle having steering knuckles connected together for simultaneous operation and a steering arm with its free end pivotally connected to the adjacent end of said second above mentioned rod, the latter being disposed obliquely to the steering axle with its last mentioned end rearmost, and connections between said axle and frame.

4. In apparatus of the class described, the combination of a frame, a pair of steering rods disposed at an angle to each other, and one obliquely to the frame, a lever pivotally connected intermediate of its ends to said frame and having its ends pivotally connected to adjacent ends of said rods, respectively, an axle having steering knuckles connected together for simultaneous operation and a steering arm with its free end pivotally connected to the rearmost end of the oblique rod, a hand steering device swiveled on said frame and having its lower end pivotally connected to the adjacent end of the second of said steering rods, and a resilient support between said frame and axle.

5. In apparatus of the class described, the combination of a frame, a lever pivoted intermediate its ends thereto, steering rods each pivoted at one end to the adjacent end of said lever, respectively, and extending at an angle to each other, one of said rods being disposed substantially longitudinally and the other obliquely of the said frame, a steering post swiveled on said frame and pivotally connected at its lower end to the adjacent end of said longitudinally disposed steering rod, an axle having steering knuckles connected together for simultaneous movement and a steering rod pivotally connected at its free end to the rearmost end of said oblique steering rod, and a resilient support between said axle and frame.

6. In steering mechanism for vehicles, the combination with an axle, steering wheels thereon, means connecting said steering wheels together for simultaneous movement about their respective steering axes, a frame supported at one end on said axle, and a hand steering device, of a steering arm for said axle, a lever pivotally connected intermediate of its ends to said frame, a rod disposed obliquely to the frame and pivotally connected at its foremost end to one end of said lever and at its other end to said steering arm, and connections between the other end of said lever and said hand steering device.

7. In steering mechanism for vehicles, the combination of an axle having steering knuckles connected by a tie rod and a steering arm rigidly secured at one end to one of said knuckles, a frame, means supporting one end of said frame on said axle, a hand steering device swiveled on said frame, and means connecting the lower end of said hand steering device to the free end of said steering arm, said means comprising a lever pivoted intermediate of its ends to said frame, a rod disposed obliquely of said frame and connected at one end to its foremost arm of said lever and at its other end to the free end of the steering arm, and a rod disposed longitudinally of said frame and connected at its front end to the other arm of said pivoted lever and at its rear end to said hand steering device.

8. In steering mechanism for vehicles, the combination of a frame, a hand steering device swiveled thereon, a rod disposed longitudinally of said frame and pivotally connected to the lower end of said hand steering device, a lever pivoted intermediate of its ends to said frame and having one of its ends connected with the front end of said longitudinally disposed rod, a rod connected at one end to the other end of said pivoted lever and extending at an angle to said longitudinally disposed rod and obliquely of the frame, an axle having steering knuckles connected by a tie rod and a steering arm with its free end connected to the other, rearmost end of said rod, and means for resiliently supporting the frame on said axle.

9. In steering mechanism for vehicles, the combination of a frame, a hand steering device swiveled thereon, a rod disposed longitudinally of said frame and pivotally connected to the lower end of said hand steering device, a lever pivoted intermediate of its ends to said frame and having one of its ends connected with the front end of said longitudinally disposed rod, a rod connected at one end to the other end of said pivoted lever and extending at an angle to said longitudinally disposed rod, an axle having steering knuckles connected by a tie rod and a steering arm with its free end connected to the other end of said rod, means for resiliently supporting the frame on said axle, and a shock absorbing device interposed between said lever and said frame.

10. In apparatus of the class described, the combination of a frame, a hand steering device swiveled thereon, a rod disposed longitudinally of said frame and pivotally connected to the lower end of said hand steering device, a lever pivoted intermediate of its ends to said frame and having one of its ends connected with the front end of said longitudinally disposed rod, an axle having steering knuckles connected together for simultaneous operation and a steering arm, a rod pivotally connected to one end of said steering arm and having its other end pivotally connected to the other end of said lever, means connecting said axle and frame together, and a shock absorbing device interposed between said lever and said frame.

11. In apparatus of the class described, the combination of a frame, a lever pivoted intermediate of its ends to said frame, a shock absorbing device interposed between said lever and said frame, an axle having steering knuckles and means connecting said knuckles together for simultaneous operation, steering connections between said steering knuckles and one end of said lever, a hand steering device, and steering connections between said hand steering device and the other end of said lever.

12. In apparatus of the class described, the combination of a frame, a hand steering device mounted thereon, a rod disposed and shiftable longitudinally of said frame and operatively connected at its rear end to said hand steering device, a lever pivoted intermediate of its ends to said frame and having one of its ends connected to the front end of said longitudinally disposed rod, an axle having steering knuckles connected together for simultaneous operation, a rod disposed obliquely to the steering axle and pivotally connected at its foremost end to the other end of said lever, means connecting the other end of said rod and said steering knuckles together, and means connecting said axle and frame together.

In testimony whereof I affix my signature, in the presence of two witnesses.

EMIL GRUENFELDT.

Witnesses:
Wm. E. Scholes,
Fred W. Johnson.